United States Patent Office 3,022,259
Patented Feb. 20, 1962

3,022,259
PROCESS FOR PURIFYING ACID-CONTAINING COMPOSITIONS
John W. Pearce, Racine, Wis.
No Drawing. Filed May 6, 1955, Ser. No. 506,676
4 Claims. (Cl. 260—22)

This invention relates to an improved process for removing free acidity present in reaction mixtures and organic compositions.

In the preparation of many chemical compositions, the composition frequently contains certain amounts of free acidity which should be removed before the composition can be used most effectively. For example, if the material is subject to decomposition in the presence of an acid, removal of the free acid would be desirable. In other instances, while the composition itself may be relatively stable in the presence of free acid, removal of the acid may be desirable in order that the composition may be used together with other materials which are affected by the presence of an acid.

While in certain instances free acidity may be readily removed by washing the composition with water or an aqueous basic solution, in some cases these methods cannot be used without considerable difficulty due to the sensitivity of the composition which is to be purified. Under the conditions used for purification, decomposition may occur, or the composition may be subject to such other effects as becoming emulsified with the water or the aqueous solution used in the purification process.

It is therefore an object of this invention to provide an improved process for removing free acidity from reaction mixtures and organic compositions.

It is another object of this invention to provide an improved process for removing free acidity from reaction mixtures and organic compositions which may be carried out so as to obtain a purified product substantially free of water.

These and other objects and advantages are attained by the present invention, various novel features of which will become more fully apparent from the following description, with patricular reference to specific examples which are to be considered as illustrative only.

The compositions with which the herein described process of purification may be used advantageously include epoxide compositions prepared by the epoxidation of olefin-containing oils and resins with hydrogen peroxide and organic acids, such as acetic acid. The process may also be used advantageously in the purification of esterification reaction products and amidification reaction products where unreacted acids are present which should be removed.

With epoxide compositions, for example, it has heretofore been difficult to remove the unreacted organic acid used in the epoxidation without at least partially destroying the epoxide content of the composition. Many epoxide compositions are sensitive to hydrolysis in the presence of water so that continued washing to remove the unreacted acid often results in partial hydrolysis of the epoxide content. In many cases the epoxide compositions are sufficiently high in softening point so that washing must be done at elevated temperatures which makes them even more receptive to hydrolysis. Removal of unreacted acid, such as acetic acid, by distillation usually requires elevated temperatures so that much of the epoxide content is destroyed by reaction with the unreacted acid when such a purification technique is used. With certain epoxide compositions, such as the epoxidized polyesters of tetrahydrophthalic acid and glycols, the solubility is such that purification by water washing cannot be done without destroying the resin itself. In certain other less soluble epoxide composition, as illustrated by an alkyd resin based on phthalic anhydride glycerol, and soyabean oil acids, removal of unreacted acid by water washing is not entirely satisfactory due to a tendency of the epoxide composition to emulsify with water. This tendency towards emulsification has been found to be of such a pronounced degree in certain cases that the emulsion cannot be satisfactorily broken by the usual emulsion-breaking techniques, such as by the addition of sodium chloride.

Similarly, the reaction products of esterification reactions and amidification reactions can readily be purified of excess free acid by the process of this invention without loss of the product through hydrolysis, and without the destruction of the compositions which would normally occur if a distillation method were used for removing the free acid. Use of the process becomes increasingly advantageous as the hydrophilic property of a composition increases, since these compositions tend to form emulsions more easily and the hydrophilic property tends to favor hydrolysis of the product. However, the herein described process would have an economic advantage of saving time and processing effort when used to purify hydrophobic compositions ordinarily unaffected by the presence of water.

Generally, it has been found that free acid may be readily removed from these compositions by treating an organic solvent solution of the composition with an anhydrous basic form of an anion exchange resin. In this manner, no water is introduced in the purification, and any water already present in the composition may also be effectively removed. For example, the epoxidized products prepared with peracetic acid formed by the reaction of aqueous hydrogen peroxide and acetic acid may contain water contributed by the aqueous hydrogen peroxide and formed in the reaction of hydrogen peroxide and acetic acid to yield the peracetic acid. This water may be removed by the anhydrous resin, together with any water formed in the neutralization of the acid during the purification, so that the epoxide composition will be relatively free of water.

In the practice of this invention, it is usually necessary to add some organic solvent to the composition which is to be purified so that the composition be sufficiently mobile to mix properly with the dehydrated anion exchange resin. The exchange resin is separated from the composition by suitable means, such as filtering, after the purification process has been completed. The exchange resin may then be washed with an organic solvent to remove any of the composition which may be present in the resin.

The anion exchange resins employed in this invention are strong, salt-splitting resins of the quaternary ammonium type. Illustrative of such resins are the Dow Chemical Company resins, Dowex 1 and Dowex 2. These quaternary type exchange resins are styrene divinylbenzene copolymers illustrated generally by the formula $RR'_3N^+OH^-$ where R represents the styrene divinylbenzene matrix and R' represents an organic radical. In the case of Dowex 1, the three R' groups are methyl groups, whereas with Dowex 2, one of the R' groups is an ethanol group. The Dowex resins are obtained commercially as the chloride salt and are converted to their base form, i.e., the chloride ions are replaced by hydroxyl ions, prior to their use as contemplated by this invention. The dehydrated form of the resin is prepared, in general, by neutralizing the resin with alkali, such as sodium hydroxide, followed by washing with water to remove the excess alkali and mineral salt formed in the neutralization, and finally drying the resin in a vacuum oven for several hours at temperatures of approximately 70–110° C.

An air-dried, neutralized form of anion exchange resin will contain up to 45% or more water depending upon the crosslinkage which has been built into the exchange resin. The degree of crosslinkage in the resin is usually controlled by varying the fraction of the polyfunctional reactant which the resin copolymer contains. Such polyfunctional reactants may be illustrated by divinylbenzene which is widely used in the preparation of anion exchange resins. The divinylbenzene contributes the third dimension to the polymer network of the exchange resin, and makes the resin insoluble. When an anion exchange resin contains a relatively large fraction of divinylbenzene, the resin is quite tightly crosslinked, so that water and other material does not easily enter the resin network. Resins which have only a slight degree of crosslinkage are free to take up many times their weight of water and swell into a jelly-like mass.

To neutralize a composition containing free acid, a dehydrated anion exchange resin is mixed with the composition so that the free acid present is neutralized. Any water present in the neutralized mixture, such as that produced in the neutralization reaction, is absorbed by the dehydrated resin to yield an emulsion-free composition. The ability of the resin to preferentially remove water may well be due to the ammonium groups present which tend to hold the water, and the relative ease with which water may enter the resin network. After having been used to remove free acid from an acid-containing composition, the anion exchange resin may be washed with a suitable solvent, such as low molecular weight ketones, treated with caustic, washed, and again dehydrated so as to prepare the resin for re-use. In this manner, resins have been redehydrated and re-used many times. Whether the process of purification be a batch or continuous one, in general, the degree of neutralization of the resin and the degree of dehydration of the resin determines when the resin should be prepared for re-use.

The following examples will serve to illustrate the invention, however, it should be understood that the invention is not intended to be limited thereby. The proportions indicated are parts by weight unless otherwise indicated.

Examples I, II, and III illustrate the preparation of three olefin-containing resins. Examples IV, V, VI and VII illustrate the epoxidation of different materials by means of a perorganic acid to yield free acid containing epoxide compositions, and subsequent removal of the free acid present in the composition using an anhydrous anion exchange resin.

EXAMPLE I

*Preparation of a polyester resin from tetrahydrophthalic anhydride and 1,4-butane-diol*

In a 3-neck flask provided with a thermometer, a mechanical agitator, and reflux condenser attached through a water trap was placed a mixture of 1.1 mols tetrahydrophthalic anhydride and 0.2 mol n-butanol. After melting the tetrahydrophthalic anhydride in the presence of the butanol, 1 mol of 1,4-butane diol was added. The reaction mixture was gradually heated with agitation to 225° C., at which point a sufficient amount of xylene was added to give refluxing at esterification temperature. The reaction mixture was then heated with continuous agitation at 225–235° C. until the acid value decreased to 8.6 (about 24 hours). Acid value as herein described represents the number of milligrams KOH equivalent to the acidity presnt in a one-gram sample. The product was a highly viscous, tacky solid having slight flow at room temperature.

EXAMPLE II

*Preparation of a polyester resin from tetrahydrophthalic anhydride and diethylene glycol*

Using the method described in Example I, a polyester was prepared from 1.1 mols tetrahydrophthalic anhydride, 1 mol diethylene glycol and 0.2 mols n-butanol. The product was a viscous, tacky solid having an acid value of 10.1.

EXAMPLE III

*Preparation of an alkyd resin*

To a kettle provided with a condenser was added 290 parts of white refined soyabean oil. While bubbling a continuous stream of nitrogen through this oil, the temperature was raised to 250° C. at which temperature 0.23 part of litharge was added and the temperature held at 250° C. for 5 minutes. While holding the temperature above 218° C., 68 parts of technical pentaerythritol was added, after which the temperature was raised to 238° C. and held until a mixture of 2½ parts of the product and 1 part of methyl alcohol showed no insolubility (about 15 minutes). At this point 136 parts of phthalic anhydride was added and the temperature gradually raised to 250° C., and held at this temperature for 30 minutes. The condenser was then removed from the kettle and the pressure reduced somewhat by attaching the kettle to a water aspirator evacuating system. With continuous agitation the mixture was then held at 250° C. until the acid value had reached 10.5. At this point the resin was thinned with xylene to 48% nonvolatile content having a viscosity of H (Gardner bubble viscosimeter).

EXAMPLE IV

*Epoxidation of the resin of Example I, followed by removal of free acid from the epoxide composition*

A dehydrated cation exchange resin of the sulfonated styrene-divinylbenzene copolymer type was prepared. Cation exchange resins of this type such as Dowex 50 (Dow Chemical Company) and Amberlite IR–120 (Rohm & Haas Company) are purchased commercially as the alkali salt form. The dehydrated cation exchange resin was prepared by washing the alkali salt from several times with 4 to 6 normal hydrochloric acid. The neutralized resin was then washed with distilled water to remove excess mineral acid and inorganic salt. The neutralized resin was dehydrated by warming the washed resin in a vacuum oven at temperatures of around 80° C. for a period of approximately 16 hours.

In a 3-neck flask provided with a thermometer, a mechanical agitator, and a reflux condenser was placed 107 parts of a dehydrated acid form of a cation exchange resin (Dowex 50 X–8, 50–100 mesh, Dow Chemical Company) and 30 parts glacial acetic acid. The mixture of cation exchange resin and acetic acid was allowed to stand until the resin had completely taken up the acid. To this mixture was added 273 parts of the polyester of Example I dissolved in an equal weight of xylene. To the continuously agitated reaction mixture was added dropwise over a period of 45 minutes to 1 hour 75 parts of 50% hydrogen peroxide. The reaction temperature was held at 60° C., requiring the application of some external heat, until a milliliter sample of the reaction mixture analysed less than 1 milliliter of 0.1 N sodium thiosulfate in an iodometric determination of hydrogen peroxide. The product was then filtered, finally pressing the cation exchange resin filter cake. The acid value of the total resin solution, amounting to 559 parts, was 56.9.

A dehydrated basic form of an anion exchange resin was prepared. Anion exchange resins, such as Dowex 1 (Dow Chemical Company), are purchased commercially as the mineral acid salt such as the hydrochloride. The salt form was first neutralized with strong alkali, such as sodium hydroxide, and finally washed free of the excess alkali and mineral salt. The wet resin was then dehydrated by placing it in a vacuum oven at a temperature of 80° C. for a period of approximately 16 hours.

The 559 parts of epoxide solution was thoroughly mixed with 175 parts of a dehydrated basic form of Dowex 1. The resulting mixture was then filtered, followed by pressing as much of the solution as possible from the anion exchange resin cake. This product had an acid value of 10.1 on the non-volatile resin content. The epoxide equivalent (number of parts resin containing one epoxide equivalent) was 304 on the nonvolatile resin content.

The epoxide values as discussed herein were determined by refluxing for 30 minutes a 2-gram sample of the epoxide composition with 50 milliliters of pyridine hydrochloride in excess pyridine. The pyridine hydrochloride solution was prepared by adding 20 milliliters of concentrated HCl to a liter of pyridine. After cooling to room temperature, the sample is then back-titrated with standard alcoholic sodium hydroxide.

This resin solution is satisfactory for many uses, such as blending with active hydrogen compositions to make coating resin solutions ready for application. In cases where the solvent-free resin is desired, the solvent may be readily removed by distillation, preferably at reduced pressure under conditions where the temperature does not rise above around 60° C. The purified product obtained after removal of the free acid was emulsion-free, and the epoxide equivalent of 304 on the nonvolatile was substantially the same as the epoxide equivalent of the composition before the free acid was removed.

EXAMPLE V

*Epoxidation of the resin of Example II followed by removal of free acid from the epoxide composition*

258 parts of the polyester from Example II was epoxidized in accordance with the procedure set forth in Example IV. The epoxidized product had an acid value of 77.2.

The epoxide composition was then treated with a dehydrated anion exchange resin according to the procedure set forth in Example IV to give a product having an epoxide equivalent of 314, and acid value of 13.2 on the nonvolatile content. The purified product obtained after removal of the free acid was emulsion-free, and had an epoxide equivalent substantially the same as the epoxide equivalent of the composition before removal of the free acid.

EXAMPLE VI

*Epoxidation of the alkyd resin of Example III followed by removal of free acid from the epoxide composition*

315 parts of the alkyd resin from Example III dissolved in 190% xylene was epoxidized in accordance with the procedure set forth in Example IV. The epoxidized product had an acid value of 52.5.

The epoxide composition was then treated with a dehydrated anion exchange resin according to the procedure set forth in Example IV to give a product having an epoxide equivalent of 425, and an acid value of 7.15 on the nonvolatile content. The purified product obtained after removal of the free acid was emulsion-free, and had an epoxide equivalent substantially the same as the epoxide equivalent of the composition before removal of the free acid.

EXAMPLE VII

*Epoxidation of a vegetable oil acid ester followed by removal of free acid from the epoxide composition*

286 parts of butyl oleate was epoxidized in accordance with the procedure set forth in Example IV. The epoxidized product had an acid value of 68 based on the 286 parts butyl oleate content of the reaction mixture.

100 parts of the epoxide reaction mixture was thoroughly mixed with 25 parts of a dehydrated basic form of Dowex I according to the procedure in Example IV. The epoxide equivalent before and after the removal of free acid remained substantially equal to 400. The purified product had an acid value of 2.6 based on the butyl oleate content.

From the foregoing, it is apparent that the present invention has provided a novel and convenient process for removing free acid from chemical compositions and reaction mixtures. With both the slightly hydrophilic epoxidized alkyd resin, and the more highly hydrophilic epoxidized polyester of tetrahydrophthalic acid and a glycol, an emulsion-free product was obtained having an acid value considerably lower than the acid value of the reaction mixture immediately following the epoxidation reaction. The epoxide value for each composition before and after the purification remained essentially the same. These water sensitive compositions are particularly susceptible to the formation of emulsions and hydrolysis of the epoxide composition, when removal of free acid is carried out using an aqueous solution. Since no water is introduced in the purification of the acid-containing compositions, the present invention can be used most advantageously with compositions ordinarily sensitive to hydrolysis, although, of course, the saving of time and processing effort possible using the present invention would make the process herein described applicable to compositions which are quite stable in the presence of water.

As used herein "quaternary ammonium" anion exchange resins refers to the base form of anion exchange resins of the quaternary type, that is, derivatives of ammonia wherein the four hydrogen atoms attached to the nitrogen atom have been replaced by organic radicals.

While various modifications of the invention have been described, it is to be understood that the invention is not limited thereto, and that it is intended to cover all modifications of the inventaion which would be apparent to one skilled in the art and that would come within the scope of the appended claims.

It is claimed and desired to secure by Letters Patent:

1. A process for the removal of free non-oxidizing acids from organic compositions containing same, said organic compositions containing oxirane oxygen and being selected from the group consisting of polyepoxide polyesters of tetrahydrophthalic acid and glycols, and esters of epoxidized ethylenically unsaturated vegetable oil, acids, which comprises admixing an inert organic solvent containing said organic composition with a quaternary ammonium anion exchange resin which is insoluble in said organic solvent containing said organic composition, said exchange resin having been rendered substantially water free by heating it to a temperature of about 80° C. for approximately 16 hours, whereby upon said admixing, an acid salt and water is formed, said exchange resin absorbing the water.

2. A process according to claim 1 wherein said exchange resin containing water is subsequently separated from said organic solution containing said organic compound.

3. A process according to claim 1 wherein the non-oxidizing acid contained in said organic composition has an electrolytic dissociation of at least about equal to acetic acid.

4. A process according to claim 1 wherein the polyepoxide polyester is an alkyd resin prepared from phthalic anhydride, pentaerythritol and soyabean oil.

References Cited in the file of this patent

UNITED STATES PATENTS

| 2,341,907 | Cheetham et al. | Feb. 15, 1944 |
|---|---|---|
| 2,458,484 | Terry et al. | Jan. 4, 1949 |
| 2,467,105 | Adelson et al. | Apr. 12, 1949 |
| 2,530,789 | Semegen | Nov. 21, 1950 |

(Other references on following page)

UNITED STATES PATENTS

| | | |
|---|---|---|
| 2,538,479 | Snyder et al. | Jan. 16, 1951 |
| 2,543,666 | Michael | Feb. 27, 1951 |
| 2,580,325 | Scott et al. | Dec. 25, 1951 |
| 2,585,652 | Hartough et al. | Feb. 12, 1952 |
| 2,615,924 | Reents | Oct. 28, 1952 |
| 2,617,800 | Bergman | Nov. 11, 1952 |
| 2,756,242 | Riener | July 24, 1956 |
| 2,785,185 | Phillips et al. | Mar. 12, 1957 |
| 2,855,371 | Abrams | Oct. 7, 1958 |
| 2,928,808 | Belanger | Mar. 15, 1960 |

FOREIGN PATENTS

| | | |
|---|---|---|
| 1,046,800 | France | July 15, 1953 |

OTHER REFERENCES

Amber-Liter, Rohm & Haas Co. Ion Exchange Report #4, Phila., Pa., November 1949.

Osborn: Synthetic Ion Exchangers, pp. 4 and 37, Chapman & Hall, London, 1955.

Findley et al.: J. Am. Chem. Soc. 67, 412–4 (1945).

UNITED STATES PATENT OFFICE
CERTIFICATE OF CORRECTION

Patent No. 3,022,259            February 20, 1962

John W. Pearce

It is hereby certified that error appears in the above numbered patent requiring correction and that the said Letters Patent should read as corrected below.

Column 1, line 8, for "proces" read -- process --; line 43, for "patricular" read -- particular --; column 2, line 6, for "composition" read -- compositions --; column 3, line 75, for "presnt" read -- present --; column 4, line 45, for "from" read -- form --; column 6, line 45, after "oil" strike out the comma.

Signed and sealed this 11th day of September 1962.

(SEAL)
Attest:

ERNEST W. SWIDER
Attesting Officer

DAVID L. LADD
Commissioner of Patents